2,785,139
Patented Mar. 12, 1957

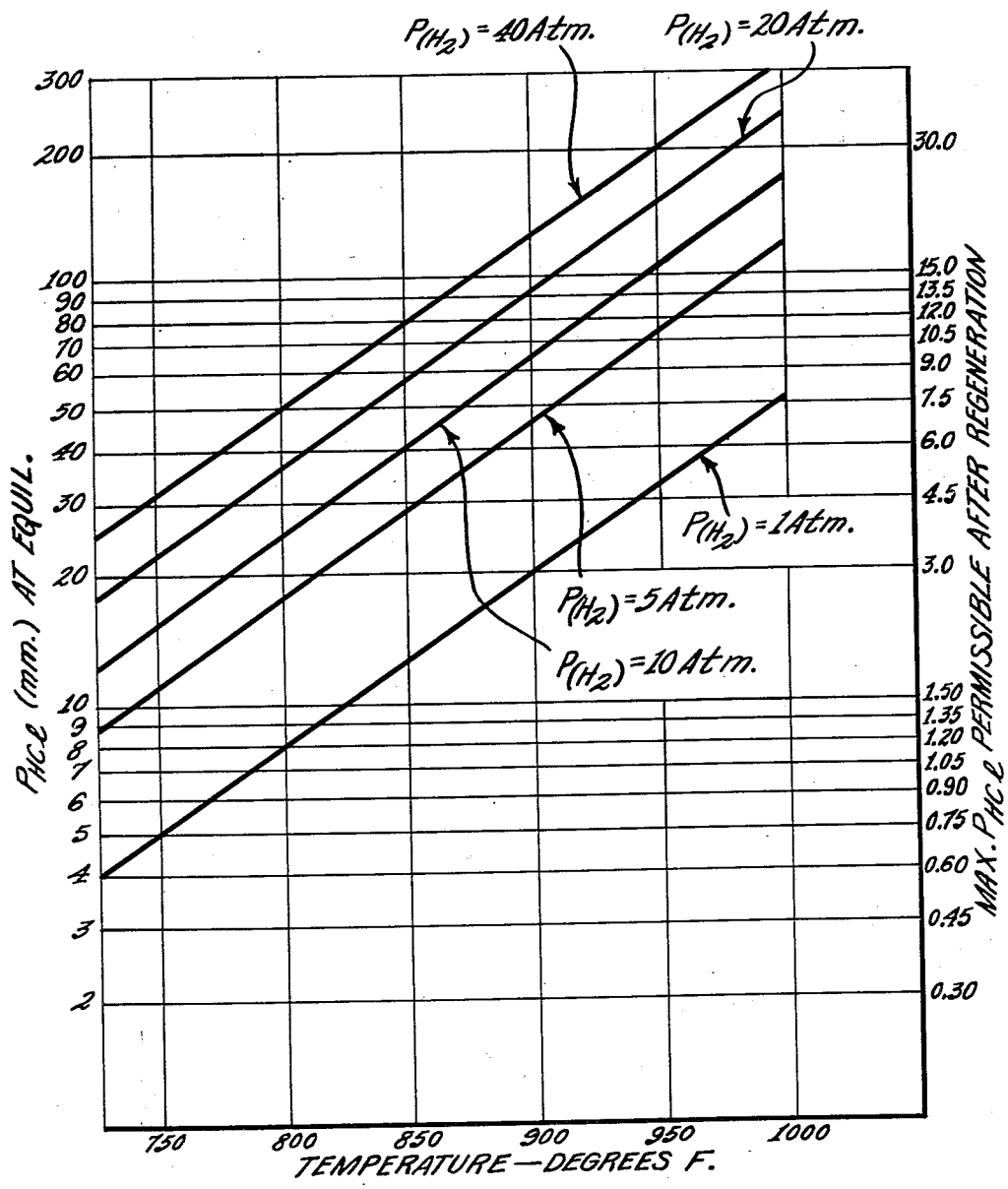

2,785,139

REGENERATION OF NOBLE METAL CATALYSTS

Heinz Heinemann, Swarthmore, Pa., assignor to Houdry Process Corporation, Wilmington, Del., a corporation of Delaware Application March 15, 1954, Serial No. 416,108

7 Claims. (Cl. 252—415)

This invention is concerned with the regeneration of catalysts used in hydrogenative reforming reactions such as for the upgrading of low octane naphthas, motor gasolines or the like to products of higher octane value. The application is more particularly concerned with the regeneration of reforming or dehydrogenation catalysts comprising platinum or analogous noble metal-containing catalysts. One aspect is directed to the regeneration of such catalysts to obtain substantially complete restoration of the various types of activities common to these catalysts.

In the processing of relatively light charge stocks such as light and heavy naphthas, motor gasoline, and the like, it is well-known to subject such materials to hydrogenative reforming. According to the type of charge stock employed, the operating conditions are adjusted to obtain various types of results with relatively moderate losses of the charge stock of less desirable or undesirable by-products such as the light fixed gases and the hydrocarbonaceous deposit on the catalyst, usually called coke. In general, these reforming operations have a relatively small amount of coke production; however, in the course of extended operations such as over a period of days, weeks or months, and depending upon the severity of the operation, greater or lesser amounts of coke accumulate on the catalyst. For instance, the tendency to form coke on the catalyst is favored when the operating conditions are severe enough to cause cracking of the charge stock or of the products formed during reaction.

The deposition of this coke on the catalyst decreases the ability of the catalyst to catalyze the desired reforming reaction with the ultimate result that eventually further operation becomes economically undesirable. Because the catalysts of the type containing platinum are very expensive and their use for hydrogenative reforming is justified only by greatly extended operating time periods, it is of considerable importance to be able to maintain such catalysts at or above their minimum acceptable activity level for the performance of the functions as reforming catalysts.

In a co-pending application, Serial No. 257,666, there is disclosed a method of regenerating catalyst of this type. The disclosure concerns the removal of coke by treatment with a gas comprising a major portion of substantially inert material and a minor portion, not exceeding 1.5% by volume, of oxygen. The temperature of regeneration is limited to less than 1000° F. and in general the rate of carbon removal is limited to no more than 3 moles of carbon per mol of noble metal in the catalyst per hour.

In further investigations of hydrogenative reforming operations of the type under consideration, it has been found that the regeneration procedure as described in the above-identified application, Serial No. 257,666, has proved satisfactory for the removal of the hydrocarbonaceous deposit from the catalyst. For use in operations wherein the dehydrogenation or hydrogenation promoting activity comprises the sole or principal function of the catalyst utilized, such regeneration procedure is completely satisfactory. The present invention, however, is particularly important in connection with dual-function catalysts of the type having both dehydrogenation-hydrogenation activity and an "acid" function, which latter function serves to promote isomerization and other reactions serving to upgrade the naphtha, including to limited extent the cracking of carbon to carbon bonds. Catalysts of this type are effective in the conversion of light and heavy naphthas, gasolines and similar materials and are particularly effective in hydrogenative reforming operations directed to the production of high yields of aromatics and/or to the production of high octane value products. In these operations an important property exhibited by these dual-function catalysts lies in their activity for promoting dehydroisomerization leading to the formation of desired aromatic ring structures.

One of the principal objects of the present invention is to provide an improved method for regeneration and/or reactivation of such dual-function catalysts containing an accumulated coke deposit, so that the regenerated catalyst has restored activity for promoting acid-catalyzed hydrocarbon conversion reactions as well as restored activity for promoting hydrogenation-dehydrogenation reactions.

One embodiment of the type of catalyst herein considered is that prepared by incorporating with a major amount of activated alumina a minor amount such as from about 0.05 up to about 2% by weight of the total catalyst of platinum. Such catalyst may be suitably prepared, for example, by impregnating activated alumina with an aqueous solution of chloroplatinic acid ($H_2PtCl_6$) containing the required amount of platinum compound followed by the conversion of the chloroplatinic acid to platinum metal. The halogen of the original chloroplatinic acid, or of any other platinum-halogen complex or compound that may be substituted for the chloroplatinic acid, becomes associated or chemically bound in the catalyst. The halogen appears to stabilize the platinum in the catalyst and is beneficial in maintaining or providing, at least in part, the "acid" function of the catalyst. When using chloroplatinic acid as the platinum-furnishing compound, there can thus be incorporated in the catalyst 6 atoms of Cl for each atom of Pt based on the formula $H_2PtCl_6$, corresponding by weight to approximately equal amounts of chloride and platinum. It has been proposed, also, to treat certain forms of alumina with halogen in various ways prior to incorporation of the platinum particularly to provide larger initial quantities of halogen in such catalyst.

It has been previously proposed, in copending application Serial No. 323,499, filed December 1, 1952, that halogen be added to the hydrogen or other gas stream employed in reduction of platinized-alumina catalyst to prevent loss of halogen during reduction or to increase the quantity of halogen in the catalyst. This treatment with halogen-containing reducing gas is described as applicable to freshly prepared catalyst as well as to used catalysts which have been subjected to oxidative regeneration or other methods of reactivation.

In further extensive investigation of the regeneration of coked platinum-on-alumina catalysts, it was observed that even when employing relatively low temperatures and relatively low oxygen partial pressures expected to lead to successful restoration of catalyst activity, this desired purpose was in many cases not obtained.

It has now been found that one of the main causes of platinum catalyst deactivation is intimately associated with the formation and presence of iron chloride in the environment of the catalyst, which apparently serves to poison the activity of the platinum. It appears that the halide present, generally as HCl vapor, in the reactor tends to react with iron in the reactor walls, in other portions of the equipment contacted, or with presumed inert fillers or heat capacity materials, such as commercial fused alumina or Corhart containing iron contaminants, with the consequent formation of volatile iron chloride. This iron chloride, in ferrous or ferric form, is then free to migrate to active sites of the platinum catalyst to exercise its poisoning effect thereon.

In accordance with the present invention this source of catalyst deactivation is obviated or substantially minimized by reducing the platinum catalyst in a gas stream free of halogen, and introducing the halogen into the reaction zone only under selected conditions of temperature and pressure disfavoring the formation of iron chlorides. Thus, it was found that deactivation of platinum catalyst was avoided and substantially full activity regained following regeneration in diluted air at lower temperature and pressure, when the catalyst was reduced with substantially pure hydrogen, and the acid agent, as halogen, was added to the hydrogen gas stream to bring the halogen content of the catalyst to the required level under conditions of temperature, pressure and concentration as described more fully hereinafter.

It can now be explained on the basis of thermodynamic considerations that the formation of iron chloride from metallic iron or iron oxide in the presence of hydrogen and halogen (as well as the reduction of iron chloride to the metal in the presence of hydrogen) is governed by the partial pressure of the hydrogen and the partial pressure of the halogen (considered as HCl) in the field of reaction. For example in the reversible reaction.

$$Fe + 2HCl \rightleftharpoons FeCl_2 + H_2$$

the value of the equilibrium constant ($K_p$) increases with elevation of temperature. Thus, at 773 K. (930° F.), $K_p = 1.23 \times 10^{-3}$; while at 673° K. (750° F.), $K_p = 4.0 \times 10^{-5}$. Since

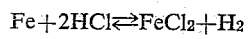

$$K_p = \frac{P_{(HCl)^2}}{P_{(H_2)}}$$

there is a minimum HCl partial pressure required for any prevailing hydrogen pressure to cause formation of iron chloride (considered here as $FeCl_2$). By remaining below this minimum pressure—which can be calculated theoretically for any given system—formation of $FeCl_2$ from the available iron can be avoided.

A better understanding of the invention is obtained by reference to the accompanying drawing, and to the following discussion and examples.

In the drawing there is shown by graphical representation the equilibrium values of $K_p$ for several different pressure conditions of 1 through 40 atmospheres for a range of temperatures of 700° F. through 1000° F. The partial pressures of acid (as HCl) are represented on the left-hand scale of the semilog graph. Thus, the partial pressure of acid ($p_{HCl}$) for establishing equilibrium conditions for the above-mentioned reaction, $$Fe + 2HCl \rightleftharpoons FeCl_2 + H_2$$

may be readily determined for the pressure and temperature ranges shown.

It has been found in accordance with this invention that successful operation is obtained when the partial pressure of the HCl in the hydrogen stream is limited to no more than 15% of the $K_p$ value. The permissible upper limit may be ascertained readily by use of the right-hand scale of the drawing for conditions of treatment within the ranges shown.

By reference to the accompanying graph, by way of illustration, the following relations can be seen:

TABLE I

| | At Temp., °F. | Partial Pressure, HCl (mm.) |
|---|---|---|
| At $H_2 = 1$ atm | 750 | 5.0 |
| | 930 | .27 |
| At $H_2 = 20$ atm | 750 | .22 |
| | 930 | 119 |

From the foregoing, it will be understood that if a relatively high partial pressure of HCl is to be employed, corresponding high temperature and/or high hydrogen pressure are needed, and that, on the other hand, at the several hydrogen pressures and temperatures given in the above table, the HCl partial pressure must be maintained at the indicated corresponding values to establish equilibrium conditions. To obtain the benefits of this invention, it has been determined, as stated above, that the HCl partial pressure must be no higher than 15% of the indicated equilibrium value. Therefore, utilizing the conditions of Table I above to determine by means of the right-hand scale of the graph the permissible upper limit of the HCl partial pressure, the following is seen:

TABLE II

| | At Temp., °F. | Permissible $p_{HCl}$ (mm.) |
|---|---|---|
| At $H_2 = 1$ atm | 750 | 0.75 |
| | 930 | 4.05 |
| At $H_2 = 20$ atm | 750 | 3.30 |
| | 930 | 17.8 |

Lesser amounts than the indicated 15% of equilibrium value of HCl may be usefully and successfully employed to restore the catalyst provided additional time of treatment is given to permit introduction of the required amount of acid. While amounts greater than the indicated 15% equilibrium value might be used with some degree of success, there is no assurance that such treatment will prove other than disadvantageous.

The temperature conditions generally suitable for the treatment of the catalyst with the hydrogen-HCl gas stream are those lying in the range of about 700° F. to about 1000° F. Temperatures below or above this range may be employed with some success, but reaction rates may be undesirably slow at lower temperatures, and higher temperatures may be detrimental to the catalyst for physical reasons.

Pressures of atmospheric to 40 atmospheres have been disclosed above. Pressures higher than 40 atmospheres, as up to 200 atmospheres or higher, are permissible, but in general such higher pressures are outside the range of usual operation and are not usually encountered.

The amount of halide incorporated in the catalyst in equilibrium amounts is in the order of 0.05 to about 2% by weight of the catalyst, as explained in greater detail in the above-identified application, Serial No. 323,499. The foregoing description has been in terms of chloride as the halide; however, bromide or iodide may be used—not necessarily with equal results. Fluorine, having higher bond energies, may give rise to oxyfluoride structures in the catalyst and is, therefore, generally not included in the present considerations, but may be included if used in excess of amounts forming such oxyfluorides.

In conducting the described treatment, it is customary to introduce sufficient halide to insure an excess amount of halide in the catalyst over that necessary to obtain equilibrium. It thereby becomes customary to subsequently treat the catalyst as by hydrogen purge to remove

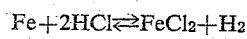

any halide in excess of the equilibrium amount prior to using the catalyst for the treatment of hydrocarbons in order that undesirable excess "acid" catalyzed reactions may be avoided.

It is evident that while this invention is particularly applicable to catalyst after regeneration, it likewise applies to fresh catalyst which is being prepared for hydrogenative reforming reactions.

The following examples are included to show chemical phenomena pertinent to typical embodiments of operations. These examples are not to be construed as limiting and are included merely for the sake of clarification.

*Example I*

A control run was made to illustrate the bad results from procedures similar to but outside the scope of the present invention. A typical reforming operation in the presence of hydrogen charging a mixed blend of light to moderately heavy naphthas was effected over a catalyst comprising about 99% alumina, 0.5% by weight of platinum and 0.5% by weight of chloride. At the end of several hundred hours of operation, the activity of the catalyst had decreased appreciably as indicated by lower gasoline yields, higher light gas production and a decrease in the temperature drop in the reaction zone. The oil was discontinued and the unit was purged at run pressure, i. e., 600 p. s. i. g., 15 minutes and then depressured to atmospheric pressure. The unit was thoroughly purged with an inert gas and the catalyst was then treated with regenerating gas, comprising an inert gas containing 0.5 volume percent of oxygen, at 700° F. for 14 hours and with regeneration gas containing 1 volume percent of oxygen at 700° F. for an additional 53 hours. At the end of this period, it appeared that substantially all of the carbon had been removed inasmuch as no carbon oxides appeared in the regeneration fumes. The unit was then thoroughly purged with an inert gas and then treated at 700–825° F. with a gas stream comprising commercial hydrogen to which had been added approximately 4 mm. Hg partial pressure HCl for 7 hours. The catalyst was then treated with the same hydrogen plus HCl gas at 825° F. for 16 hours after which the pressure of the unit was raised from atmospheric to operating pressure, i. e., 600 lbs. p. s. i. g.

The unit was put back on stream with the same charge stock and substantially no improvement of the product distribution and quality was obtained over that obtained prior to the regeneration; the stability of the catalyst was considerably poorer than the original catalyst in new condition.

At the completion of the reforming operations on this catalyst, the catalyst was removed from the unit and analyzed by standard analytical procedure. It was determined by these analyses that the catalyst contained 0.30% $Fe_2O_3$.

*Example II*

In a similar operation to that of Example I, the catalyst, after several hundred hours of operating with naphtha charge, was subjected to regeneration under substantially the same conditions as those of Example I except that the hydrogen-HCl treatment was effected at 800–825° F. and at atmospheric pressure with a partial pressure of HCl of 1 mm. for 12 hours followed by 0.4 mm. for 4 hours. The unit was repressured to 600 p. s. i. g., and the unit was put back on stream at conditions substantially the same as those existing before the regeneration and with the same type of charge stock.

The preliminary operation on the freshly regenerated catalyst gave a product having higher octane number than that obtained with fresh catalyst. After a short operating period in which the operation became stabilized, the product octane was at a level of 90–91 F–1 clear as compared to an octane level of 83.3 F–1 clear prior to the regeneration. Continued operation showed that the catalyst activity was at least as stable as fresh catalyst under similar operating conditions as evidenced by the temperature drops throughout the catalyst, by the maintenance of high octane numbers and, in general, favorable product distribution.

After extended operations with this catalyst on hydrogenative reforming reactions, it was removed from the reaction zone and analyzed. Analysis showed that no iron was present in the alumina in excess of that originally present, i. e., about 0.06% $Fe_2O_3$.

*Example III*

In another hydrogenative reforming operation, operating on a cycle of 96 hours on stream at 925° F., 300 lbs. p. s. i. g., 3 LHSV and 6 hydrogen to naphtha ratio with an East Texas light naphtha stock containing approximately 0.0035 weight percent HCl as tertiary-butyl-chloride, and with intervening periods for regeneration of the catalyst, the following information is available.

In one set of experiments, each regeneration was followed by purge with hydrogen and HCl at 0 p. s. i. g., 925° F., with 4 mm. HCl partial pressure. In each instance, the regenerations were unsuccessful in restoring fresh catalyst activity as indicated by product distribution and octane numbers, and, in some instances, failed to result in any octane improvement. The catalyst thus employed in these experiments by subsequent analysis showed the presence of 0.36% $Fe_2O_3$ as compared to 0.06% $Fe_2O_3$ in the fresh catalyst.

In a similar set of experiments following the same procedure of operation except that after the regeneration period the catalyst was purged with hydrogen and HCl at 0 p. s. i. g., 925° F. with 1 mm. partial pressure of HCl. In each instance the activity of the catalyst was restored to at least as high a level as with the fresh catalyst as indicated by product distribution and octane level. Analysis of this catalyst after subsequent removal from the reaction zone indicates that the presence of extraneous iron other than that originally present is substantially absent.

As is evidenced in the foregoing examples and of the thermodynamic considerations, the transfer of iron from any place within the reaction zone onto the catalyst proper can be avoided by operating in accordance with the conditions of this invention. It is obviously of prime importance that the partial pressure of the chloride ion must be substantially below the level at which iron chloride, either ferric or ferrous, is formed inasmuch as it appears that the chlorides of iron, for reasons unknown, are fairly mobile and transfer from their place of formation onto the catalyst if allowed to form in the first place.

Obviously many modifications and variations of the invention as hereinbefore set forth may be made without departing from the spirit and scope thereof, and, therefore, only such limitations should be imposed as are indicated in the appended claims.

I claim:

1. The method of activating catalyst in an environment comprising ferrous components, said catalyst having dehydrogenation-hydrogenation activity provided by noble metal and acid function activity, comprising treating such catalyst in the substantial absence of normally liquid hydrocarbons and carbon with a gas consisting predominantly of hydrogen and containing hydrogen chloride in a small amount no greater than 15% of the hydrogen chloride partial pressure based on the $K_p$ value for the formation of iron chloride at the treating conditions, whereby migration of iron chloride onto the catalyst is prevented.

2. The method of activating dual-function catalyst in an environment comprising ferrous components, said catalyst of the type having dehydrogenation-hydrogenation activity and an acid function, comprising treating such catalyst with a reducing gas consisting predominantly of hydrogen at reducing conditions in the absence of added acid, and subsequently adding the acid function by treating said reduced catalyst in the substantial absence of normally liquid hydrocarbons with hydrogen containing hydrogen chloride in a small amount of no more than 15% of the hydrogen chloride partial pressure based on the $K_p$ value for the formation of the iron chloride at the treating conditions, whereby migration of iron chloride onto the catalyst is prevented.

3. The process for the reactivation of coked platinum-on-alumina type catalysts in an environment comprising ferrous components, said process comprising, treating said inactivated catalyst to remove therefrom substantially all of the inactivating amounts of coke, reducing said catalyst and thereafter treating said catalyst with a reducing gas consisting essentially of a major amount of hydrogen and a minor amount of hydrogen chloride-providing gas present in amounts no greater than 15% of the hydrogen chloride partial pressure based on the $K_p$ value for the pressure and temperature conditions as appearing in the accompanying graph, whereby migration of iron chloride onto the catalyst is prevented.

4. The method of regenerating dual-function catalysts in an environment comprising ferrous components, said catalysts containing an accumulated coke deposit for the restoration of activity for promoting acid catalyzed hydrocarbon conversion reactions as well as restoring activity for promoting dehydrogenation-hydrogenation reactions, comprising subjecting such deactivated catalyst to oxidative treatment for the removal of the inactivating amounts of coke at conditions of relatively low temperature and low oxygen concentrations, reducing said coke-free catalyst in a gas stream free of halogen, and thereafter introducing hydrogen chloride with hydrogen into the reaction zone to bring the chloride content of the catalyst to the level of 0.05 to 2% by weight of the catalyst under conditions of temperature in the range of 700–1000° F., pressure in the range of atmospheric to 200 atmospheres, said hydrogen chloride being present in an amount equivalent to no more than 15% of the partial pressure of hydrogen chloride required for the formation of iron chlorides at the treating conditions.

5. The method for regeneration of platinum-on-alumina catalysts in an environment comprising ferrous materials, said catalysts being inactivated by accumulated coke deposit and loss of acid catalyzing reaction activity, said catalyst comprising activated alumina having incorporated therewith 0.05 to about 2% by weight of the catalyst of platinum and 0.05 to about 2% by weight of the catalyst of chloride ion, comprising treating such inactivated catalyst to remove inactivating amounts of coke, treating such coke-free catalyst in an apparatus comprising ferrous components with a reducing gas at reducing conditions and effecting thereby substantially complete reduction of the platinum to metallic form, subsequently treating in said ferrous apparatus said reduced catalyst with a gas stream substantially free from normally liquid hydrocarbons and containing a major amount of hydrogen and a minor amount of hydrogen chloride present in an amount in the range of no more than 0.6 mm. of mercury partial pressure at 700° F. to amounts graduated uniformly therefrom to no more than 72 mm. of mercury partial pressure at 1000° F., such treatment being at pressures respectively graduated similarly from 1 atmosphere to 40 atmospheres, and continuing the treatment of such catalyst for a time period sufficient to establish the presence of chloride in the catalyst in an amount in the range of 0.05 to about 2% by weight of the total catalyst.

6. The method in accordance with claim 5 in which said reactivated catalyst is purged with hydrogen to remove chloride in excess of that amount in equilibrium condition in the catalyst.

7. The process of reactivating platinum-on-alumina reforming catalysts which have been deactivated by an accumulation of coke and by loss of acid function activity, comprising purging said deactivated catalyst, adjusting pressure conditions to atmospheric, treating said deactivated catalyst at atmospheric conditions with regenerating gas comprising with an inert gas containing no more than than 1 volume percent of oxygen at about 700° F. for time sufficient to effect substantially complete removal of inactivating amounts of coke as indicated by a substantial absence of carbon oxides in the regeneration fumes, purging such coke-free catalyst, treating said purged catalyst at temperature in the range of 800–825° F. with a gas stream comprising hydrogen to which has been added approximately 1 mm. of mercury partial pressure of HCl for a time period of at least 2 hours, adjusting the pressure to approximately 600 p. s. i. g., and continuing treating said catalyst in said last-mentioned gas stream at temperature of about 825° F. for a time period sufficient to insure the presence of at least 0.5% by weight of the catalyst of chlorine in said catalyst.

References Cited in the file of this patent

UNITED STATES PATENTS

| | | |
|---|---|---|
| 2,606,878 | Haensel | Aug. 12, 1952 |
| 2,635,080 | Appell | Apr. 14, 1953 |
| 2,642,384 | Cox | June 16, 1953 |